United States Patent [19]
Moynihan

[11] Patent Number: 6,069,654
[45] Date of Patent: *May 30, 2000

[54] SYSTEM AND METHOD FOR FAR-FIELD DETERMINATION OF STORE POSITION AND ATTITUDE FOR SEPARATION AND BALLISTICS

[75] Inventor: Andrew Moynihan, Fort Worth, Tex.

[73] Assignee: Lockheed Martin Corporation

[ * ] Notice: This patent issued on a continued prosecution application filed under 37 CFR 1.53(d), and is subject to the twenty year patent term provisions of 35 U.S.C. 154(a)(2).

[21] Appl. No.: 08/602,124

[22] Filed: Feb. 15, 1996

[51] Int. Cl.$^7$ .............................. H04N 7/00; H04N 7/18; H04N 9/47
[52] U.S. Cl. ........................... 348/144; 348/117; 434/14; 434/15; 434/27
[58] Field of Search ..................................... 348/144, 117, 348/135–142; 340/353.3; 364/449.1, 460; 89/1.51, 1.801, 1.802; 434/11, 14, 15, 27; H04N 7/00, 7/18, 9/47

[56] References Cited

U.S. PATENT DOCUMENTS

| | | | |
|---|---|---|---|
| 4,121,246 | 10/1978 | Fadden et al. | 348/144 |
| 4,158,853 | 6/1979 | Sullivan et al. | 358/93 |
| 4,290,364 | 9/1981 | Weidenhagen et al. | 348/117 |
| 4,639,222 | 1/1987 | Vishlizky | 434/20 |
| 4,814,846 | 3/1989 | Matsumoto et al. | 357/30 |
| 4,825,055 | 4/1989 | Pollock | 235/411 |
| 5,117,230 | 5/1992 | Wedel, Jr. | 342/169 |
| 5,157,451 | 10/1992 | Taboada et al. | 356/5 |
| 5,216,476 | 6/1993 | Lanckton | 356/2 |
| 5,242,135 | 9/1993 | Scott | 244/158 |
| 5,259,037 | 11/1993 | Plunk | 382/1 |
| 5,270,756 | 12/1993 | Busenberg | 358/109 |
| 5,342,051 | 8/1994 | Ramkin et al. | 273/185 |
| 5,413,345 | 5/1995 | Nauck | 273/185 R |
| 5,422,829 | 6/1995 | Pollock | 364/516 |
| 5,467,122 | 11/1995 | Bowker et al. | 348/144 |
| 5,481,479 | 1/1996 | Wight et al. | 364/525 |
| 5,597,335 | 1/1997 | Woodland | 441/36 |
| 5,625,409 | 4/1997 | Rosier et al. | 348/144 |

*Primary Examiner*—Tommy P. Chin
*Assistant Examiner*—Nhon T. Diep
*Attorney, Agent, or Firm*—Gary Cary Ware & Freidenrich LLP

[57] ABSTRACT

This invention relates to a system and method for far-field determination of store position and attitude for separation and ballistics. The aircraft is outfitted with two photogrammetric video cameras. The store is dropped from the aircraft and the cameras record data describing the descent of the store while the on-board avionics record data describing the flight path of the aircraft. Following the flight, the data are correlated using a computer to obtain a true store position vs. time while separating from the aircraft.

21 Claims, 2 Drawing Sheets

SYSTEM AND METHOD FOR FAR-FIELD DETERMINATION OF STORE POSITION AND ATTITUDE FOR SEPARATION AND BALLISTICS

TECHNICAL FIELD OF THE INVENTION

This invention relates to far-field ballistic determination and more particularly to the use of photogrammetric analysis for determination of far-field ballistics.

BACKGROUND OF THE INVENTION

Photogrammetric analysis is used to determine the position and attitude of a store after separation from an aircraft. Store is defined as any item released or dropped by the aircraft and includes weapons, fuel tanks, and other carriage items. "Far-field" refers to the distance of the store from the aircraft, generally beyond but including the flow field affects of the aircraft, following separation from the aircraft. In this case store position will be tracked for up to 10 seconds after separation involving distances of up to a half mile or more from the aircraft.

Photogrammetry involves the use of aerial photographs to produce maps and charts. Generally, photogrammetry works on the principle of stereo pairs of cameras producing overlapping image scenes. The area of common overlap is known as the stereoscopic overlap.

Current methods of far-field ballistic determination requires the use of one of a limited number of government precision bombing ranges available. Scheduling is particularly difficult in view of the limited number of facilities. The test aircraft flies over the range while being tracked by several (usually three) ground-based range precision cameras to gather Time-Space-Position Information (TSPI). This information correlates the aircraft's position only. Additional ground-based TSPI cameras, often up to three or more, are also required to determine the position of the store throughout its trajectory after being separated from the aircraft. TSPI data are processed and analyzed post-flight to provide a time-correlated comparison of aircraft and store positioning.

This method of determining far-field ballistic characteristics is extremely expensive, typically costing on the order of $30,000.00 per hour in 1996 dollars. Moreover, this method is dependent on the operational availability of a multitude of complex and expensive components and operators, including multiple TSPI cameras, government precision bombing ranges and multiple personnel to perform the filming. Additionally, this current methodology can only provide test store position (not attitude) information. Further, since the prior methods utilize ground-based cameras, the system is susceptible to the vagaries of the weather, e.g., fog, rain, low cloud cover, etc.

These and other disadvantages of current far-field ballistic determination systems and methods are sought to be overcome by the invention embodied by the preferred embodiment.

SUMMARY OF THE INVENTION

A technical feature of the present invention is that it provides a self-contained, far-field ballistic determination system and method which does not rely on ground-based cameras in the data collection process.

Another technical feature of the present invention is that it provides a far-field ballistic determination system and method which are not dependent on the weather or on the availability of a government precision bombing range.

These and other technical features of the present invention are accomplished by an aircraft outfitted with at least one, but preferably two TSPI cameras. All of the necessary data is gathered solely from the test aircraft. The data consists of parameters which may be used following the flight to determine the aircraft's position throughout the period of interest, as well as store position and attitude relative to the aircraft's position after separation.

One technical advantage of the present invention is that testing may be carried out without the expense of reserving time at a government operated precision bombing range. While a suitable area for dropping the store is still required, the present invention eliminates the need to reserve one of a limited number of government precision bombing ranges. Any area suitable for separating a store from an aircraft will do.

Another technical advantage in addition to the elimination of the need for the precision range, is the elimination of the TSPI equipment and the personnel needed to operate the equipment. A significant cost savings is thus realized.

Yet another technical advantage is the reduction of lost testing time due to weather, e.g., fog, since all of the cameras are aircraft-based. If the weather is unacceptable in one drop area, the aircraft may be easily transported to another range or to higher or lower altitudes so that the testing may be conducted.

Still further, the present invention includes equipment taken directly off the airplane. For instance, a data storage unit may be removed from the aircraft and plugged directly into a computer for on-site photogrammetric processing.

Another technical advantage is that the present invention allows far-field ballistic determination without the use of ground-based TSPI-type cameras.

Further objects, features and advantages of the present invention will be understood from the detailed description of the preferred embodiment when read in conjunction with the drawings.

BRIEF DESCRIPTION OF THE DRAWINGS

The present invention is best understood upon a reading of the detailed description of illustrative embodiments when viewed together with the following drawings wherein common reference numerals refer to like and corresponding elements, and further wherein.

DETAILED DESCRIPTION OF THE PREFERRED EMBODIMENT

Figure 1:
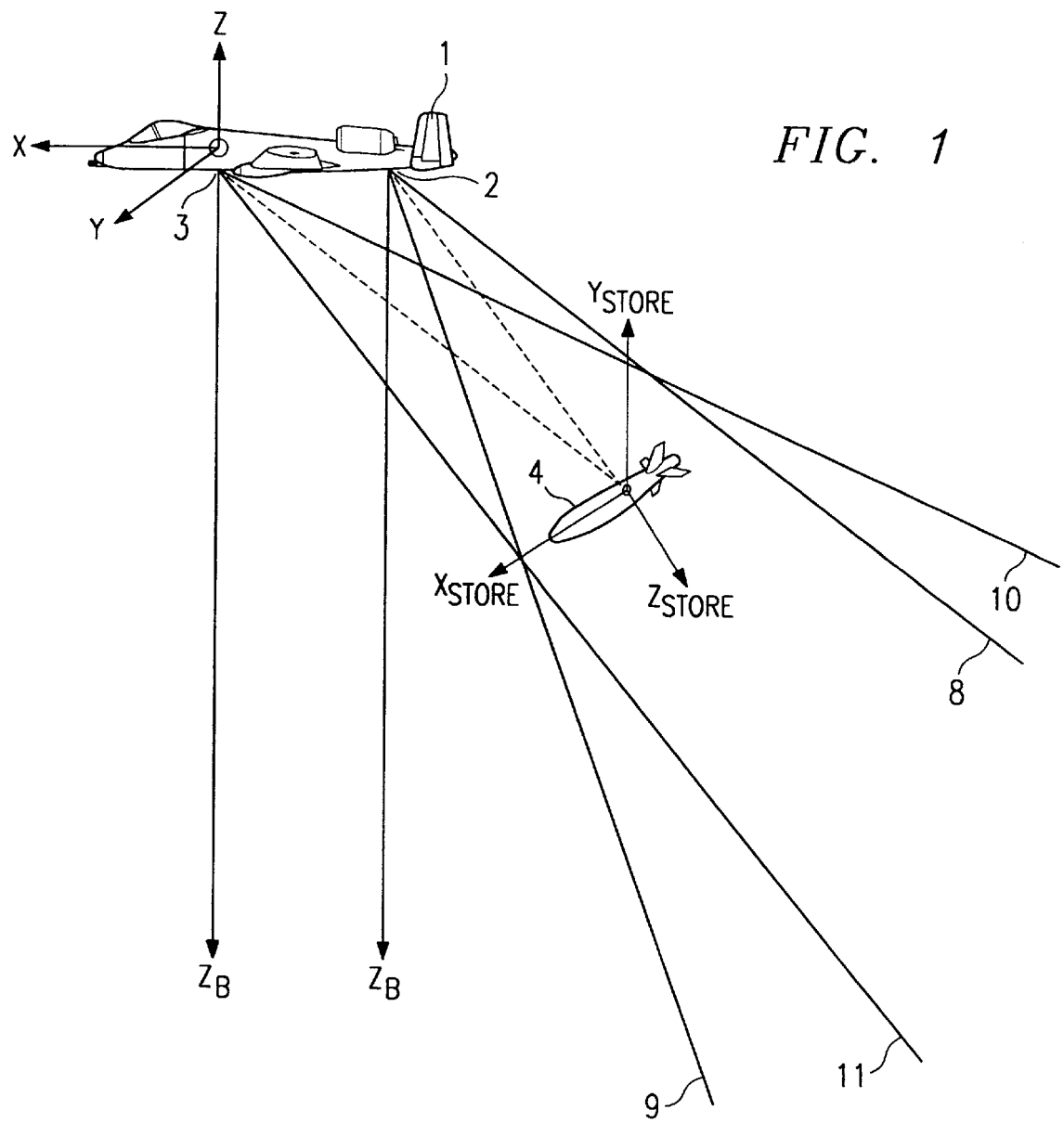
FIG. 1 is a schematic illustration of far-field ballistic determination for store separation delivery using photogrammetric analysis according to the preferred embodiment.

With reference to FIG. 1, there is shown a schematic illustration of the overall concept of far-field ballistic determination using photogrammetric analysis. The illustrated aircraft 1 is preferably configured with cameras 2, 3. Either high speed film or digital image video cameras may be used, but digital image video cameras provide more flexibility for data handling and thus are preferred. While the cameras 2, 3 are depicted as being located at specific relative positions on the aircraft, these positions are merely illustrative of locations that could be used. Other camera locations along the aircraft are also possible. Furthermore, while the preferred embodiment utilizes two cameras, more cameras could be used. Multiple camera determination of the store position provides greater system accuracy.

Figure 2:
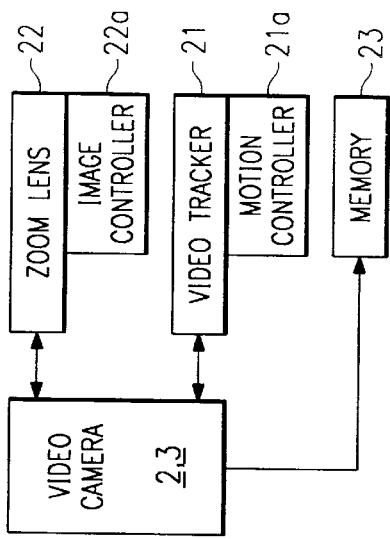
FIG. 2 is an illustrative system of the on-aircraft photogrammetric equipment according to the preferred embodiment.

With reference to FIG. 2, a block illustration of one of the on-board photogrammetric video cameras according to the preferred embodiment is shown. Each video camera 2, 3 is preferably fitted with a commercially available video tracker 21 to monitor the test store throughout its trajectory as it separates from the aircraft 1. Video trackers 21 are well known in art. For instance, one video tracker system disclosed in U.S. Pat. No. 5,342,501, which is hereby incorporated by reference, provides a background discussion of basic video tracker technology. Video tracker units typically track movement in the X-Y-Z field. Movement of the video trackers is controlled by an integrated motion controller 21a.

In addition, each of the video cameras 2, 3 is configured with an electronically controlled zoom lens 22. The zoom lens 22 maintains a substantially uniform store image size throughout the flight path of the store. Each of the zoom lenses 22 on the video cameras 2, 3 are preferably calibrated throughout their full focal range before testing. Adjustment of the electronically controlled zoom lens 22 is controlled by an integrated image controller 22a.

The storage media shown for the recording of the digital imagery is digital tape. Other mass storage devices may also be used. Digital imagery is highly flexible and may be readily manipulated. It also eliminates the need for high speed film processing and editing. However, either digital imagery or film may be used with equally satisfactory results.

Cameras 2, 3 are commercially available high resolution digital imaging devices capable of electronic shutter speeds of at least 50 microseconds. An example of this type of camera is the Kodak EKTAPRO.

All data recorded by the cameras 2, 3, e.g., aircraft position and store position, is IRIG-B (inter-range instrumentation group-B) time encoded for correlation post-flight by a computer. Data storage 23 for camera images can be either self-contained within the camera unit itself or in a separate processing unit. On the Kodak EKTAPRO, for example, memory device 23 is integral with the camera unit. The fields-of-view for the video cameras 2, 3, identified by lines 8, 9 and 10, 11, respectively, in FIG. 1 are used to determine store 4 position relative to the aircraft and store attitude, i.e., X, Y, Z or roll, pitch, yaw, by modified photogrammetric co-linearity equations 7 parameter transformation (scale, X, Y, Z, R, P, Y).

In operation, the aircraft 1 flies over a suitable area, and the store is dropped. Unguided or "dumb" bombs, for instance, MK-84's, MK-82's, or similar ballistic-type bombs, are dropped from the aircraft. The aircraft instrumentation system records the time of release of the store. The time of release is correlated on a computer following the flight with the results of the filming to obtain a true store position vs. time as described in more detail below.

Figure 3:
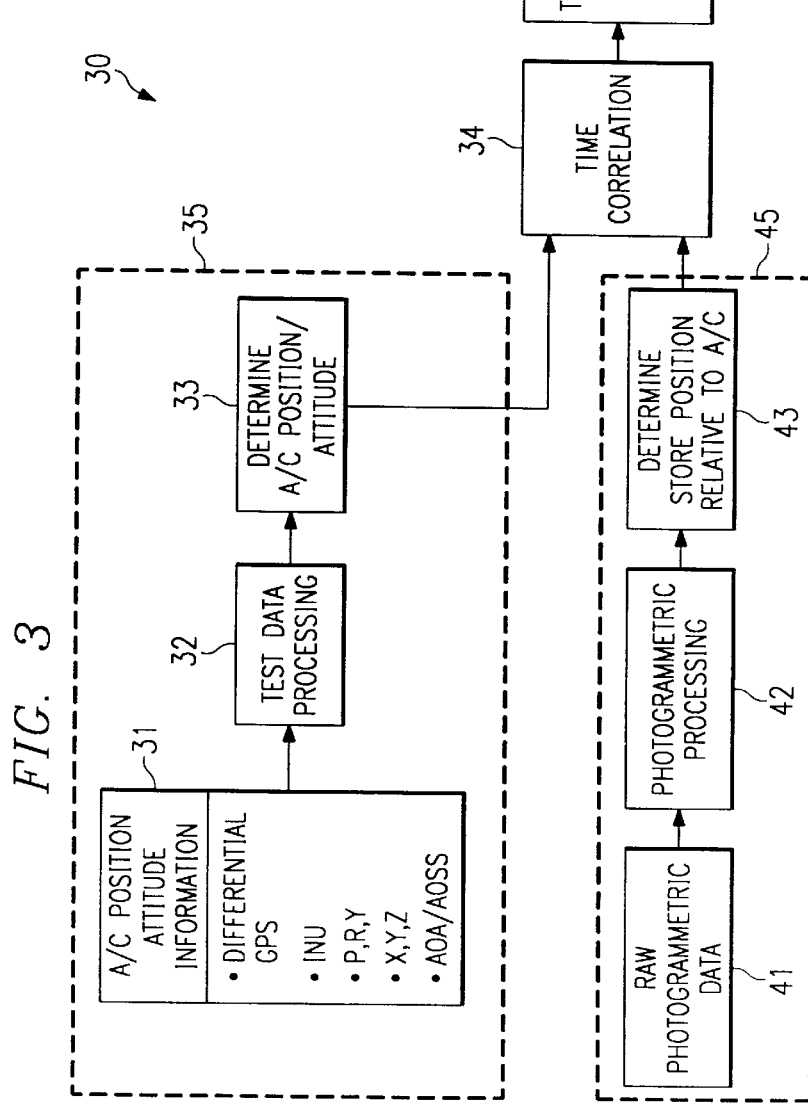
FIG. 3 is a block diagram of the aircraft and photogrammetric data analysis methodology according to the preferred embodiment.

Referring to FIG. 3, a block diagram of the aircraft and photogrammetric data analysis methodology 30 according to the preferred embodiment is depicted. Two parallel paths of analyses are simultaneously performed. The first, 35, is the processing of on-aircraft data to determine aircraft position and attitude. The second, 45, is the photogrammetric analysis of the descent of the store relative to the aircraft as taken by the cameras 2,3.

In the first processing path 35, aircraft position and attitude are determined by analysis of information acquired from the aircraft's instrumentation system, including multiplexed (Mux) bus data and other production or flight test instrumentation signals. Multiplexing involves a networking of output signals from production avionics systems that shares required signals with one another. This data may be recorded by the flight test instrumentation system. The aircraft instrumentation system at step 31 collects time of store separation; Differential Global Positioning System (DGPS) output; Inertial Navigation Unit (INU) output; pitch, roll and yaw angles and rates; and Angle-of-Attack and Angle-of-Sideslip derived from either production or flight test sources. Angle of attack is essentially the angle between the relative wind and the chord line of the wing. Side slip is the deviation in the yaw direction from the center line.

After the aircraft position and attitude information is obtained from the on-board instrumentation system at 31, this test data is processed at 32. Step 32 uses standard flight test processing techniques, and from these a determination of the true aircraft attitude and position is obtained at block 33.

While the aircraft position processing is occurring in path 35, the camera data related to the store position is processed in path 45. First, in block 41, the raw photogrammetric data is obtained from the cameras 2, 3. The photogrammetric data is processed in step 42 using standard photogrammetric processing techniques and triangulation equations. Next, the store position and attitude relative to the aircraft may be determined in step 43.

After the aircraft has landed, the data indicative of the store position vs. time and the data indicative of the position of the aircraft vs. time may be extracted from the storage medium, e.g., digital tape, via a playback machine interfaced to a digital computer. These data are combined in step 34, where the computer correlates the data indicative of the store position vs. time with the data indicative of the position of the aircraft vs. time to provide a true store position vs. time in step 51. The independent results of paths 35 and 45 are time correlated using IRIG-B time information recorded in the cameras 2, 3 and by the on-board flight test instrumentation recorder. The independent results of paths 35 and 45, with the assistance of a computer, yield time correlated data 34 for both the aircraft 1 and the store 4. Utilizing standard flight test analysis methods yield the final results of true store position and attitude versus time 51. The present embodiment includes an IRIG-B time input to both the cameras and the aircraft instrumentation system as inputs from the time code generator( used to synch with IRIG-B standard time) prior to flight. However, since these data are processed in two separate paths 35 and 45, this data, when combined, is synchronized with via data processing.

While the invention has been described in terms of the preferred embodiment, it will be readily appreciated by those skilled in the art that changes and modifications may be made to the preferred embodiment without departing from the spirit and scope of the invention as defined by the appended claims.

What is claimed is:

1. A method for far-field determination of store position and attitude for separation and ballistics, said method comprising the steps of:

providing at least a first camera on an aircraft for recording the relative position of the store versus time after said store has been released from said aircraft as it descends with respect to the aircraft;

releasing the store during flight of the aircraft;

recording on a first recording medium photogrammetric data indicative of the store position versus time using said at least first camera;

determining the store position versus time relative to the aircraft based on said photogrammetric data;

recording on a second recording medium data indicative of the true aircraft position versus time while simultaneously recording data indicative of the store position versus time;

determining the true aircraft position versus time; and processing said data indicative of the true aircraft position versus time and said data indicative of the store position versus time to obtain a correlation of the flight of the store with respect to the flight of said aircraft during a specified time interval.

2. The method of claim 1, said step of recording aircraft position comprising the step of recording aircraft position with aircraft avionics.

3. The method of claim 1, said step of providing at least a first camera further comprising the step of providing a plurality of video cameras on said aircraft.

4. The method of claim 1, said step of recording photogrammetric data indicative of the store position comprising the steps of:

providing a zoom lens on said at least first camera;

providing an image controller to control the degree with which the zoom lens zooms in on the store;

providing a tracker on said at least first camera; and providing a motion controller to direct said at least first camera at the store during descent.

5. The method of claim 1, said step of combining said data indicative of the aircraft position and said data indicative of the store position further comprising the step of providing said data to a processor to obtain a true store position versus time.

6. A system for determining the position versus time of a store with respect to an aircraft following the release of the store from the aircraft, said system comprising:

a first camera positioned on the aircraft for recording the relative position of the store as it descends with respect to the aircraft;

first recording device for recording photogrammetric data indicative of the store position using said at least first camera;

first determining device for determining the store position versus time relative to the aircraft based on said photogrammetric data;

second recording device for recording data indicative of the aircraft position versus time, said second recording device simultaneously recording data indicative of the aircraft position versus time while said first recording device records data indicative of the store position versus time;

second determining device for determining the true aircraft position versus time; and a processing device for combining said data indicative of the true aircraft position versus time and said data indicative of the store position versus time to obtain a correlation of the flight of the store with respect to the flight of said aircraft during a specified time interval.

7. The system according to claim 6 further comprising a second camera positioned on the aircraft for recording the relative position of the store as it descends with respect to the aircraft.

8. The system according to claim 7, wherein said first camera and said second camera comprise video cameras.

9. The system according to claim 8, said video cameras comprising a zoom lens and an image controller, said image controller controlling the degree to which said zoom lens zooms in on the store during descent.

10. The system according to claim 9, said video cameras further comprising a video tracker and a motion controller, said motion controller controlling the viewing angle of said video cameras.

11. The system according to claim 6, said first recording means comprising photographic film.

12. A method for forming a system for determining the position versus time of a store with respect to an aircraft following the release of the store from an aircraft, said method comprising the steps of:

forming a first camera positioned on the aircraft for recording the relative position of the store versus time as it descends with respect to the aircraft;

forming a first recording device for recording photogrammetric data indicative of the store position versus time using said at least first camera;

forming a first determining device for determining the store position relative to the aircraft based on said photogrammetric data;

forming a second recording device for recording data indicative of the true aircraft position versus time, said second recording device simultaneously recording data indicative of the true aircraft position versus time while said first recording device records data indicative of the store position versus time;

forming a second determining device for determining the true aircraft position versus time; and forming a processing device for combining said data indicative of the true aircraft position versus time and said data indicative of the store position versus time to obtain a correlation of the flight of the store with respect to the flight of said aircraft during a specified time interval.

13. The method of claim 12 further comprising the step of forming a second camera positioned on the aircraft for recording the relative position of the store as it descends with respect to the aircraft.

14. The method of claim 13, wherein said first and said second camera comprise video cameras.

15. The method of claim 13, further comprising the step of forming said video cameras to comprise a zoom lens and an image controller for controlling the degree to which said zoom lens zooms in on the store during descent.

16. The method of claim 13, further comprising the step of forming said video cameras to comprise a video tracker and a motion controller, said motion controller controlling the viewing angle of said video cameras.

17. The method of claim 12, further comprising the step of forming said first recording means to comprise a photographic film.

18. A method for determination of a store's ballistics, the method comprising the steps of:

releasing the store from an aircraft during flight, the store released at a predetermined aircraft position versus time;

recording first data indicative of the store's ballistics on a first recording medium using a first camera, the first camera located on the aircraft;

recording second data indicative of the aircraft position and the store's ballistics using a second camera;

determining the store's ballistics by correlating the data indicative of the store's ballistics and the data indicative of the aircraft position.

19. The method according to claim 18 wherein the second camera is located on the aircraft.

20. The method according to claim 18 wherein the store's ballistics comprise the store's attitude.

21. The method according to claim 19 wherein the store's ballistics comprise the store's position.

* * * * *